US006546122B1

United States Patent
Russo

(10) Patent No.: US 6,546,122 B1
(45) Date of Patent: Apr. 8, 2003

(54) METHOD FOR COMBINING FINGERPRINT TEMPLATES REPRESENTING VARIOUS SENSED AREAS OF A FINGERPRINT TO DERIVE ONE FINGERPRINT TEMPLATE REPRESENTING THE FINGERPRINT

(75) Inventor: Anthony P. Russo, New York, NY (US)

(73) Assignee: Veridicom, Inc., Sunnyvale, CA (US)

(*) Notice: Subject to any disclaimer, the term of this patent is extended or adjusted under 35 U.S.C. 154(b) by 0 days.

(21) Appl. No.: 09/363,938

(22) Filed: Jul. 29, 1999

(51) Int. Cl.[7] .................................................. G06K 9/00
(52) U.S. Cl. ....................... 382/125; 382/125; 382/209
(58) Field of Search ........................... 382/124–127, 382/193, 209, 195, 215–219, 260, 266, 274, 296, 304; 356/71; 340/825.34, 5.83; 902/3; 713/186

(56) References Cited

U.S. PATENT DOCUMENTS

| 4,135,147 | A |   | 1/1979  | Riganati et al. | 340/146.3 |
|-----------|---|---|---------|-----------------|-----------|
| 4,646,352 | A |   | 2/1987  | Asai et al.     | 382/5     |
| 4,805,223 | A | * | 2/1989  | Denyer          | 382/127   |
| 5,524,161 | A | * | 6/1996  | Omori et al.    | 382/125   |
| 5,717,777 | A | * | 2/1998  | Wong et al.     | 382/124   |
| 6,023,530 | A | * | 2/2000  | Wilson          | 382/219   |
| 6,314,197 | B1| * | 11/2001 | Jain et al.     | 382/289   |
| 6,330,347 | B1| * | 12/2001 | Vajna           | 382/125   |

OTHER PUBLICATIONS

Ballard, et al., Computer Vision, Prentice–Hall, Inc., 1982, Chapt. 3, Section 3.2, pp. 65–71.

* cited by examiner

Primary Examiner—Bhavesh Mehta
Assistant Examiner—Sheela Chawan

(57) ABSTRACT

A method for combining two templates. A first template having a first minutia set and a second template having a second minutia set are provided. The first template is compared with the second template to obtain a matching minutia set. Registration parameters are calculated from the matching minutia set. The registration parameters can be referenced to either the first minutia set or the second minutia set. All minutiae in the first or the second minutia set are translated to be on the same coordinate system as the other minutia set. The minutia sets are then combined to construct a combined minutia set. In one embodiment, an overlap region is drawn for the first template and the second template, the overlap region containing at least minutiae from the matching minutia set. The combined minutia set is constructed from the matching minutiae in the first or the second template, minutiae in the first minutia set that are not in the matching minutia set, and minutiae in the second minutia set that are not in the matching minutia set. In another embodiment, minutiae in the overlap region but not part of the matching minutia set are discarded.

20 Claims, 14 Drawing Sheets

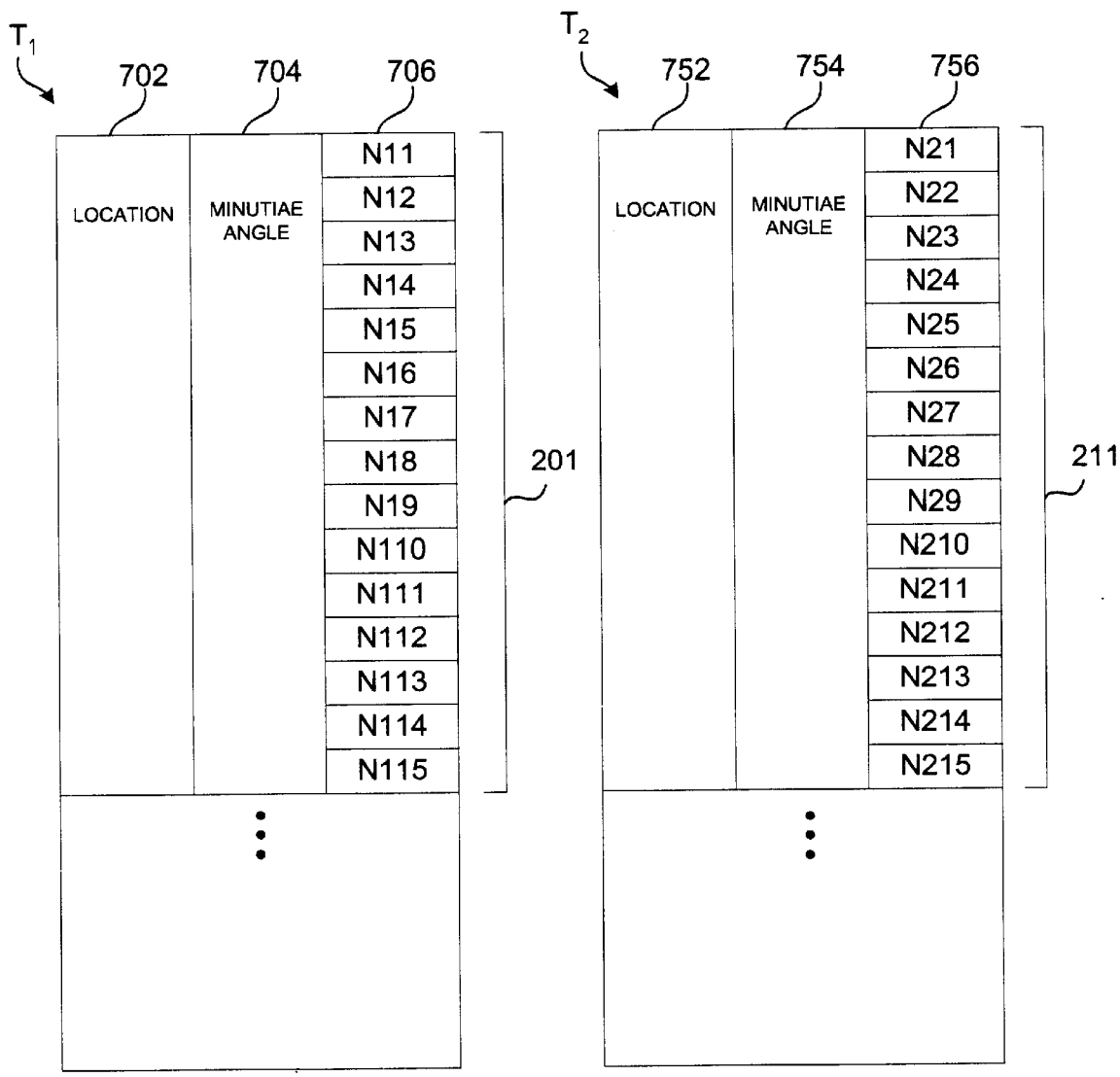
FIG. 7A  FIG. 7B
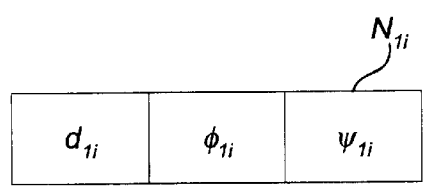
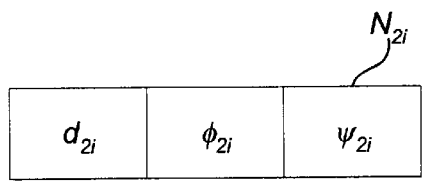
FIG. 7C  FIG. 7D

METHOD FOR COMBINING FINGERPRINT TEMPLATES REPRESENTING VARIOUS SENSED AREAS OF A FINGERPRINT TO DERIVE ONE FINGERPRINT TEMPLATE REPRESENTING THE FINGERPRINT

CROSS REFERENCE TO APPENDIX

Appendix A, which is a part of the present disclosure, is a listing of software code for embodiments of components of this invention, which are described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to fingerprint verification. More particularly, this invention relates to methods for combining fingerprint templates obtained from various portions of a finger into one fingerprint template representing the combined fingerprint.

BACKGROUND OF THE INVENTION

Biometric identification is used to verify the identity of a person by digitally measuring selected features of some physical characteristic and comparing those measurements with those filed for the person in a reference database, or sometimes on a smart card carried by the person. Physical characteristics that are being used include fingerprints, voiceprints, the geometry of the hand, the pattern of blood vessels on the wrist and on the retina of the eye, the topography of the iris of the eye, facial patterns and the dynamics of writing a signature and typing on a keyboard.

The fingerprint is one of the most widely used physical characteristics in biometric identification. Fingerprints are utilized as the most reliable means to identify individuals because of two outstanding characteristics, namely that they remain unchanged all through life and differ from individual to individual. Fingerprints consist of raised friction ridges of skin separated by recessed valleys of skin. Fingerprint "minutiae" are conventionally defined as ridge endings or ridge bifurcations where a ridge splits into two ridges.

Since the matching of a fingerprint as an image can require large file capacity to store the measured and referenced features and complex computation to match measured features with reference features, fingerprint identification is carried out using the positional relationship of features or minutiae that are extracted from the fingerprint image. The minutiae representing a fingerprint image are digitized and stored in a digital memory, which may be a read-only memory, magnetic tape, or the like. A fingerprint digitized in this manner may be compared with reference fingerprints stored in the memory. For the comparison to work, the reference fingerprint and the measured fingerprint must be extracted, characterized, and digitized so that the fingerprint templates contain the same information and have the same format.

As fingerprint sensing gains momentum in application, manufacturers are gearing up for high volume production, deploying both silicon-based sensors as well as the traditional optical sensors. As the production volumes increase, these manufacturers will continue to cost-reduce their products to stay competitive. One way to reduce cost is to decrease the size of the sensor. However, as the sensors get smaller, the matching accuracy is correspondingly reduced because less data is available for comparison. Furthermore, the size of the fingerprint sensor is often limited by the size of the finger in order to obtain a full fingerprint.

Placing the user's finger on the sensor in different positions and then pasting the images of the sensed portions of the finger together is one solution in reducing the size of a fingerprint sensor. The images taken from the various areas of the finger are typically aligned with a registration software and essentially "glued" together.

FIG. 1A shows an image 10 having a partial fingerprint of a finger. FIG. 1B shows an image 12 having a partial fingerprint from the same finger but at a different position. As can be seen from FIGS. 1A and 1B, image 10 overlaps image 12. For example, image 10 shows the top portion of a fingerprint while image 12 shows the bottom portion of the same fingerprint and both images 10 and 12 show the middle portion of the fingerprint. FIG. 1C shows an image 14 having a combined fingerprint derived by gluing images 10 and 12 together using an image correlation algorithm, for example, as described by Dana H. Ballard and Christopher M. Brown in a book entitled "Computer Vision" (1982) on pages 65–71, hereby incorporated by reference.

In image correlation, a template is created from a particular feature which is in effect a subimage. A similarity measure is computed which reflects how well the image data of another image match the template for each possible template location. The point of maximal match is then selected as the location of the feature. The template-matching calculations may be visualized by imagining the template being shifted across the image to different offsets to locate where in the image the feature occurs. The two images can then be aligned and combined.

However, image alignment, especially for poorly imaged fingers resulting from, for example, dry fingers, is a difficult task and is computationally expensive. Furthermore, because the finger has a fluid surface, the surface of the finger stretches and varies under different conditions. Hence, the ridge definition is rarely exactly the same twice. This inherent difference causes the overlap regions to be different, producing an artifact effect when glued together. In other words, the overlap region appears to be formed by two different sources because the transition at the overlap regions is not smooth. Therefore, the image correlation algorithm must take these conditions into account during the match, thereby requiring additional computation. A further problem is rotation which must be taken into account because the various portions of fingerprint may be obtained with the finger in different orientations.

Therefore, what is needed is a method for combining various templates from various portions of a finger, the method being computationally inexpensive.

SUMMARY OF THE INVENTION

A method for combining two templates. A first template having a first minutia set and a second template having a second minutia set are provided. In one embodiment, each template comprises at least one data chunk which represents one minutia. Each minutia is characterized by a location, a minutia angle and a neighborhood. The location further includes an x-coordinate and a y-coordinate. The neighborhood includes a plurality of neighbors, each having a distance from the selected minutia and two related angles. In one embodiment, all the parameters are quantized to reduce the bits required to represent the distance and the related angles of a minutia, hence decreasing the memory requirement.

The first template is compared with the second template to obtain a matching minutia set. The templates are compared on a data chunk by data chunk basis and by comparing each characterization parameters of the data chunks. Comparing on a data chunk by data chunk basis allows a computer with low computational power to execute the template matching algorithm. If all characterization parameters match, the data chunks match. The matching minutia pair is stored as a part of a matching minutia set in a memory accessible by a computer.

Registration parameters are calculated from the matching minutia set. Each registration parameter is calculated by summing the difference of each minutia pair in the matching minutia set and dividing the sum by the number of minutia pairs in the matching minutia set. In one embodiment, the registration parameters are in reference to the first minutia set. In another embodiment, the registration parameters are in reference to the second minutia set.

All minutiae in the minutia set that is not the reference minutia set are translated to be on the same coordinate system as the reference minutia set. The translation is done by adding the registration parameters to the characterization parameters of the minutia set that is not the reference minutia set. The minutia set and the translated minutia set are then combined to construct a combined minutia set. In one embodiment, an overlap region is drawn for the first minutia set and the second minutia set. In one embodiment, the overlap region is the smallest possible rectangle enclosing all matching minutiae. The combined minutia set is then constructed from the matching minutiae in the first or the second template, minutiae in the first minutia set that are not in the matching minutia set, and minutiae in the second minutia set that are not in the matching minutia set. In another embodiment, minutiae in the overlap region but not part of the matching minutia set are discarded.

By combining two templates from two images taken from a finger at different positions, a combined template representing the larger, combined image is obtained. This combined template can then be used in fingerprint matching. Hence, the size of the sensor can be decreased while retaining matching accuracy at a reduced cost.

BRIEF DESCRIPTION OF THE DRAWINGS

The present invention may be better understood, and its numerous objects, features, and advantages made apparent to those skilled in the art by referencing the accompanying drawings.

FIG. 7A shows a data chunk in a fingerprint template comprising location, minutia angle and neighborhood parameters.

FIG. 7B shows a data chunk in another fingerprint template comprising location, minutia angle and neighborhood parameters.

FIG. 7C shows a neighborhood for a fingerprint template having various positional parameters.

FIG. 7D shows a neighborhood for another fingerprint template having various positional parameters.

The use of the same reference symbols in different drawings indicates similar or identical items.

DETAILED DESCRIPTION

Figure 1A:
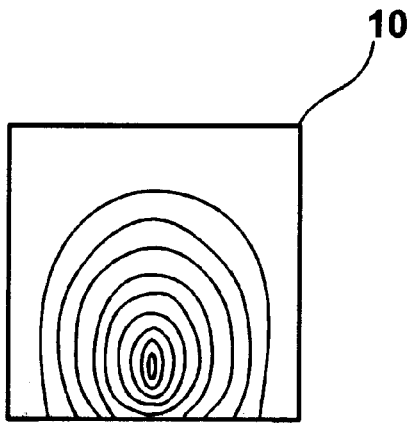
FIG. 1A is an image containing a partial fingerprint.
Figure 1B:
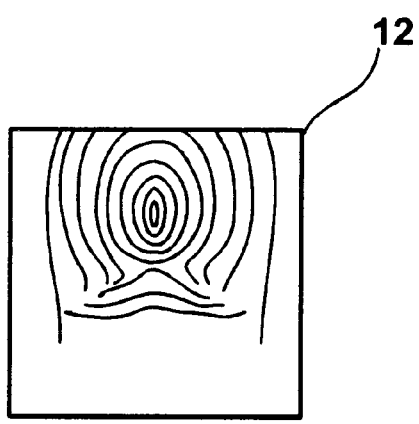
FIG. 1B is an image containing a partial fingerprint.
Figure 1C:
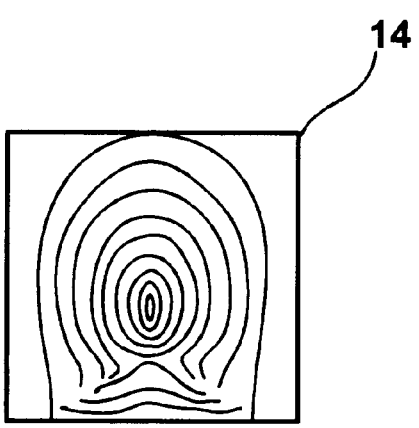
FIG. 1C is an image containing a fingerprint constructed from the partial fingerprints shown in FIG. 1A and FIG. 1B.
Figure 2:
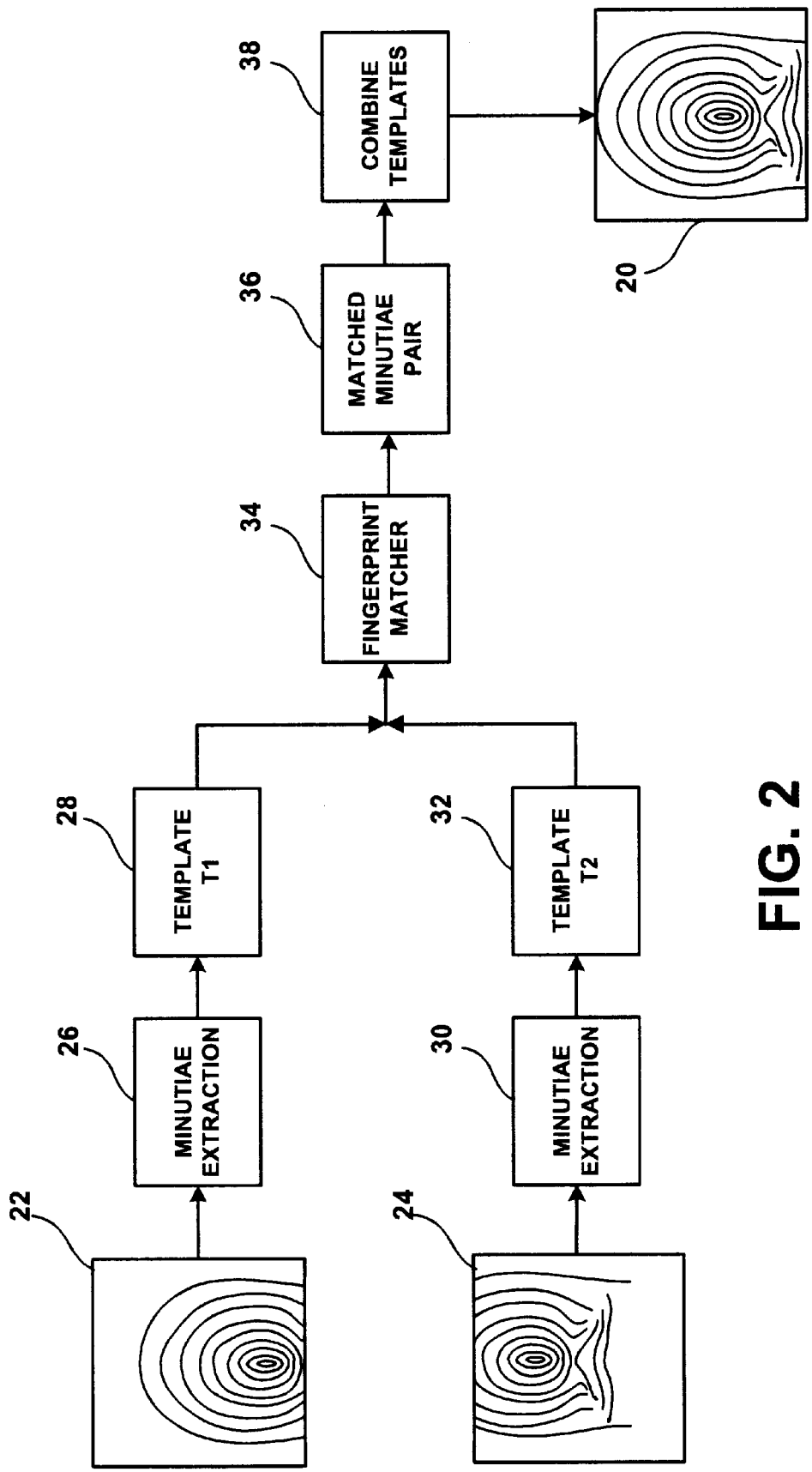
FIG. 2 shows a fingerprint template constructed from two partial fingerprints in accordance with the present invention.

FIG. 2 shows a fingerprint template 20 ($T_{combined}$) constructed from two images (hereinafter, partial fingerprint images 22 and 24) obtained from different areas of a fingerprint in accordance with the present invention. Minutiae are extracted from partial fingerprint image 22 in minutiae extraction step 26. A fingerprint template $T_1$ is created in step 28 from the extracted minutiae using methods well known in the art. Similarly, minutiae are extracted from partial fingerprint image 24 in minutiae extraction step 30 and a fingerprint template $T_2$ is then created from the extracted minutiae in step 32. Fingerprint template $T_1$ and fingerprint template $T_2$ are compared in step 34 to locate matching minutiae using a fingerprint matching algorithm as described in, for example, co-pending U.S. patent application Ser. No. 09/354,929, hereby incorporated by reference in its entirety. Matching minutiae pairs are then printed or stored in a memory in step 36 so that a computer can access the data later. If the number of matching minutiae pairs is sufficient to meet a predetermined number, there is a sufficient overlap region between fingerprint template $T_1$ and fingerprint template $T_2$ and the fingerprint templates are combined in step 38 to derive a combined fingerprint template $T_{combined}$ which represents a combined fingerprint image. Each step is further described below.

A finger is placed on a fingerprint sensor in arbitrary positions so that the measured fingerprint portions overlap by at least approximately one-third. In general, the size of overlap is predetermined such that the overlap contains sufficient number of minutiae for a match. The number of matching minutiae required for a match is in turn predetermined based on the accuracy required by a particular application. For example, accessing a typical office building does not require the same security level as accessing a vault in a bank. Hence, to access an office building, a match of 7 minutiae may be required. However, to access the vault of a bank, 15 matches may be required.

An image, e.g., partial fingerprint image 22, is taken from a finger in the first position. The finger is then placed on the sensor slightly to the left, right, up or down to obtain a second image, e.g. partial fingerprint image 24. Partial fingerprint images 22 and 24 are then compared to determined whether the images are taken from the same finger, i.e., have a sufficient overlap area. If the user moved too much, e.g., partial fingerprint images 22 and 24 overlap less than one-third, there is likely no match between partial fingerprint images 22 and 24. Since the algorithm is attempting to match fingerprint images from the same finger, a match failure is likely due to too much movement. Therefore, in one embodiment, the user interface may have a visual or an audible display to indicate too much movement. The sensor device may assist the user in placing his/her finger by having sensor markings, for example, outlining the finger portion with dash lines.

In one embodiment, the fingerprint sensor is a capacitive fingerprint sensor described in U.S. patent application Ser. No. 08/735,100 filed Dec. 15, 1995, and assigned to the same assignee as the present invention, and is hereby incorporated by reference in its entirety. In another embodiment, the fingerprint sensor is a capacitive fingerprint sensor described in U.S. patent application Ser. No. 09/354,386 filed Jul. 14, 1999, assigned to the same assignee as the present invention, and is hereby incorporated by reference in its entirety. Of course, other types of fingerprint sensors can be used.

Each partial fingerprint image 22 and partial fingerprint image 24 is processed by standard fingerprint processing software to extract minutiae points and to create fingerprint templates. Specifically, minutiae are extracted from partial fingerprint images 22 and 24 to create fingerprint templates $T_1$ and $T_2$, respectively. Minutiae can be extracted from a fingerprint using any known methods. For example, ridge skeletonization technique can be used. This technique uses an iterative process to thin a ridge line by discarding pixels that do not affect the continuity of the ridge line until a single pixel line is remaining, the end point of which is the minutia. Other types of minutia extraction technique are described in, for example, U.S. Pat. No. 4,646,352 entitled "Method and Device for Matching Fingerprints with Precise Minutia Pairs Selected From Coarse Pairs" issued Feb. 24, 1987 to Asai et al. and U.S. Pat. No. 4,135,147 entitled "Minutiae Pattern Matcher" issued Jan. 16, 1979 to Riganati et al. The minutia extraction technique is not described in further detail in this application because it is not part of the invention.

A fingerprint template is then generated from the extracted minutiae by first characterizing each extracted minutia and then creating a neighborhood for each extracted minutia. In general, the fingerprint template is a collection of data chunks, each data chunk representing an extracted minutia and containing a characterization of that minutia and its neighborhood. In one embodiment, the characterization parameters of a minutia include a location and a minutia angle. The location contains an x-coordinate and a y-coordinate. The neighborhood contains positional parameters such as a distance between a minutia and one of its neighbor minutiae and two related angles. Data chunk generation is described in detail with respect to FIG. 3 which shows how each minutia is characterized and FIGS. 4A through 4E and FIG. 5 which show how a neighborhood is constructed.

Figure 3:
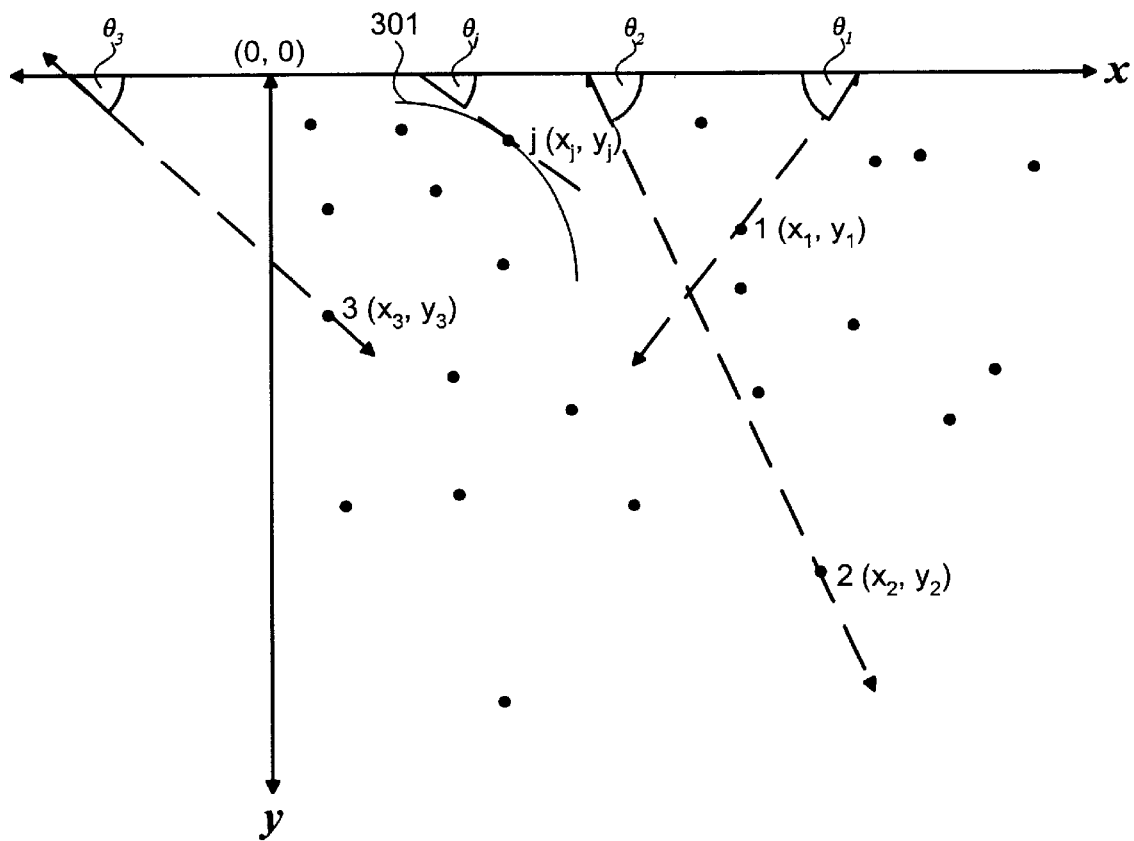
FIG. 3 shows how a minutia is represented.

Referring to FIG. 3, an x-axis and a y-axis are constructed so that the point (0,0) is at the upper left hand corner of a fingerprint image. The x-axis and the y-axis are drawn regardless of the rotation or the translation of the fingerprint, as will be discussed later. Each minutia in a fingerprint image is characterized by location $(x_j, y_j)$ and a minutia angle $\theta_j$, where j is the number of minutiae extracted from a fingerprint image. Location $(x_j, y_j)$ is the location of minutia j with respect to x- and y-axis. Minutia angle $\theta_j$ is the angle between the x-axis and a line tangential to a ridge 301 where minutia j is extracted. Of importance, all data chunks must contain the same characterization parameters.

Figure 4A:
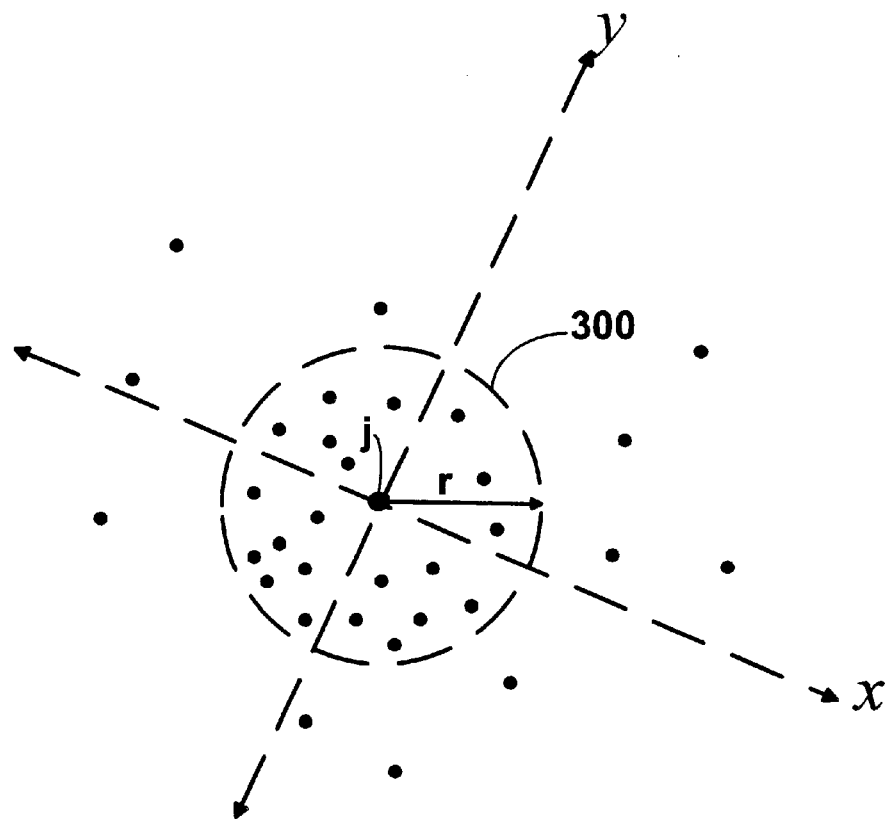
FIG. 4A shows a circular neighborhood boundary.
Figure 4B:
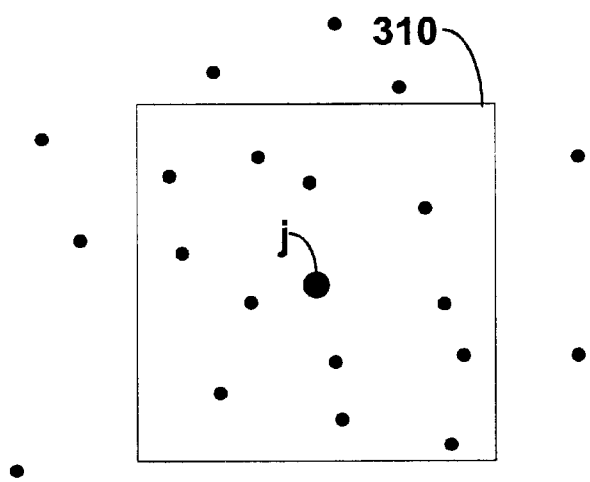
FIG. 4B shows a square neighborhood boundary.

A neighborhood $NH_j$ is constructed for each minutia j. FIGS. 4A–4E illustrate various ways of selecting neighbor minutiae in constructing neighborhood $NH_j$ for minutia j. In one embodiment, an optional neighborhood boundary is drawn around minutia j. For example, a circle 300 of a fixed radius r, e.g., 90 pixels, is drawn using minutia j as the center point, as shown in FIG. 4A, to provide a neighborhood boundary. In an alternative embodiment, a box 310, representing the neighborhood boundary, is drawn using minutia j as the center point, as shown in FIG. 4B. Of course, any predetermined neighborhood boundary of any shape or size can be drawn.

A predetermined number of neighbor minutiae are selected from the enclosed area. In one embodiment, fifteen (15) minutiae (excluding minutia j) within the neighborhood boundary are selected as the neighbor minutiae for neighborhood $NH_j$. If the enclosed area contains less than the predetermined number of neighbor minutiae, all of the neighbor minutiae contained in the enclosed area are selected. It is noted that neighborhood $NH_j$ contains multiple neighbor minutiae $N_1–N_i$ where i is a predetermined number, so that there is enough information to make the neighborhood $NH_j$ unique to meet the accuracy requirement. The number of the neighbors, in general, depends on the uniqueness of the neighborhood $NH_j$ desired. The uniqueness of the neighborhood determines how often a good fingerprint is rejected (i.e., false rejection rate) and how often a bad fingerprint is accepted (i.e., false acceptance rate).

Figure 4C:
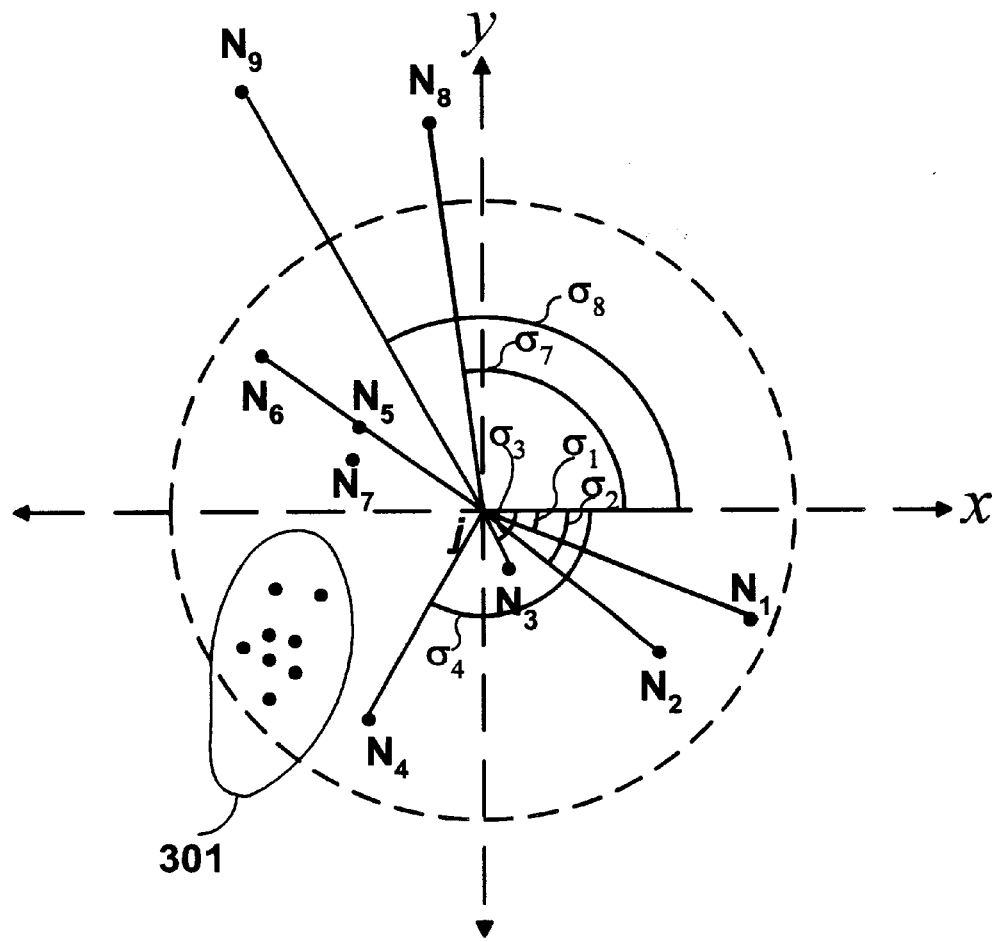
FIG. 4C shows a method of neighbor selection

In one embodiment, the neighbor minutiae are selected such as to maximize the spread around the center point, i.e., minutia j. Referring to FIG. 4C, an x-axis is drawn in the direction of the line tangential to a ridge line at minutia j. A line is drawn from minutia j to a minutia $N_1$, forming an angle $\sigma_1$ between the x-axis and the line. Similarly, a line is drawn from minutia j to each of the remaining minutiae within the enclosed area, each forming an angle $\sigma_k$ with the x-axis, where k is the number of the minutiae within the enclosed area. A mean is calculated from angles $\sigma_k$.

In one embodiment, the mean is calculated in a complex domain since mean calculation in a degree domain would be more complicated due to the cyclical nature of the angles. A complex number C can be described as a sum of its real and imaginary parts a and b, respectively, i.e., C=a+ib where i is the square root of −1.

Figure 4D:
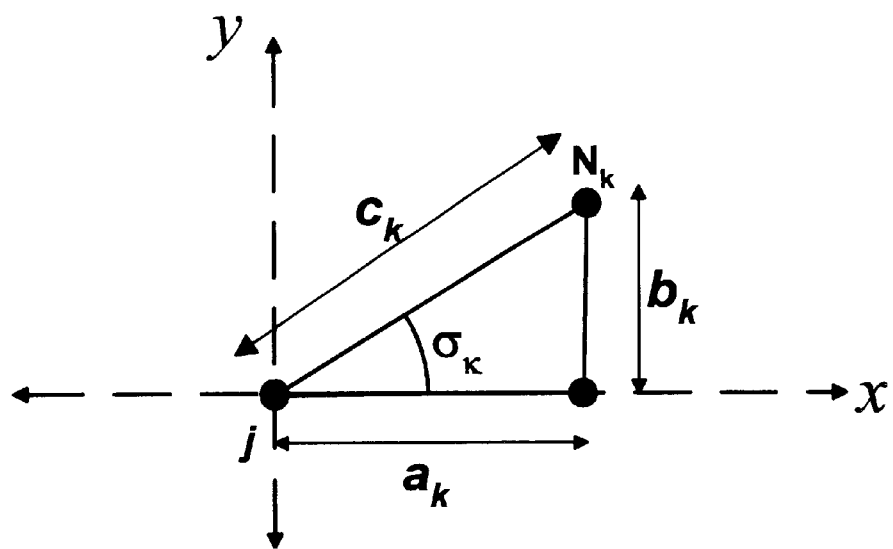
FIG. 4D shows an angle to be represented in complex domain.

Referring to FIG. 4D, angles can be expressed in terms of complex numbers by the following equality:

$$C_k = \cos(\sigma_k) - i\sin(\sigma_k)$$

where $$\sigma_k = \tan^{-1}(b_k/a_k).$$

Thus, the real part of angle $\sigma_k$ is $a_k=\cos(\sigma_k)$ and the imaginary part of angle $\sigma_k$ is $b_k=\sin(\sigma_k)$. To get an average of all the angles $\sigma_k$, each angle $\sigma_k$ is converted to its complex equivalent. The real part $a_k$ and the imaginary part $b_k$ are then averaged separately. The averaged real part $a_{avg}$ and the averaged imaginary part $b_{avg}$ are then converted back to a real number representation $\sigma_{avg}$, for example, $$a_{avg} = \frac{\sum_k (a_k)}{k};$$

$$b_{avg} = \frac{\sum_k (b_k)}{k};$$

and $\sigma_{avg} = \tan^{-1}(b_{avg}/a_{avg})$.

In one embodiment, each angle $\sigma_k$ is examined to determine how close it is to the average angle $\sigma_{avg}$ by subtracting angle $\sigma_k$ from average angle $\sigma_{avg}$ to get a difference $\sigma_{kdiff}$. A predetermined number of minutiae that have the largest difference $\sigma_{kdiff}$ are selected so that the entire neighborhood has maximum standard angular deviation. It is noted that if there is a cluster of minutiae such as cluster 301 shown in FIG. 4C, the average would be closer to cluster 301. Thus the minutiae that are within cluster 301 would be closer to the calculated mean. In one embodiment, if the number of minutiae within the boundary is more than the predetermined number of neighbor minutiae, the minutiae within cluster 301 would not be selected. If one or more minutiae must be selected from cluster 301 to meet the predetermined number of neighbor minutiae, the minutiae are selected randomly. In other words, the minutiae within cluster 301 are less likely to be selected than the minutiae outside of cluster 301.

In one embodiment, if multiple minutiae, such as minutiae $N_5$ and $N_6$, have the same angles, the distances between minutia $N_5$ and minutia j and between minutia $N_6$ and minutia j are used for a tie breaker, e.g., the shorter the distance, the more likely the minutia would be selected. In another embodiment, if a minutia, i.e., minutia $N_3$, is too close to minutia j, e.g., 10 pixels, the minutia is not selected. In yet another embodiment, the neighbor minutiae that are furthest away (in distance) from each other are selected. In one embodiment, if two or more neighbor minutiae are very close to each other, e.g., 10 pixels, such as neighbor minutia $N_5$ and neighbor minutia $N_7$, either both neighbor minutiae $N_5$ and $N_7$ are eliminated or one of neighbor minutiae $N_5$ and $N_7$ is arbitrarily selected.

Figure 4E:
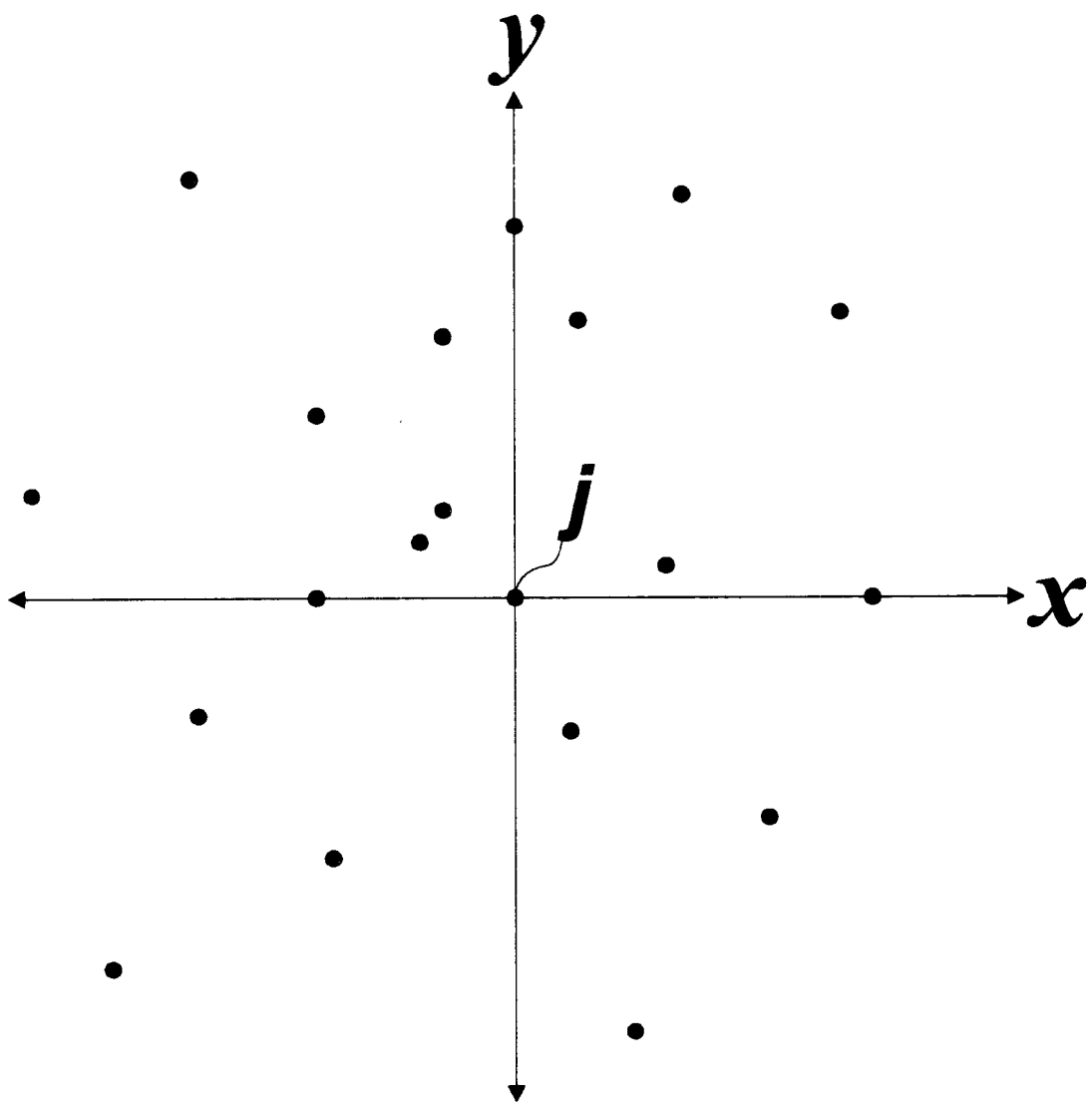
FIG. 4E shows an embodiment of a method of neighbor selection.

If no neighborhood boundary is drawn, all extracted minutiae are used for neighbor selection described above. In an additional embodiment, a quadrant is arbitrarily drawn with minutia j as the center point and a predetermined number of neighbor minutiae are then selected from each quadrant, as shown in FIG. 4E. In general, any neighbor minutiae extraction method may be used to extract the predetermined number i of neighbor minutiae for constructing a neighborhood $NH_j$.

After the neighbor minutiae are selected, a neighborhood $NH_j$ is constructed by deriving three positional parameters for each neighbor minutia. The positional parameters are derived in reference to minutia j. These positional parameters include a distance $d_i$ and two angles $\phi_i$ and $\phi_i$, where i is the number of neighbor minutiae.

Figure 5:
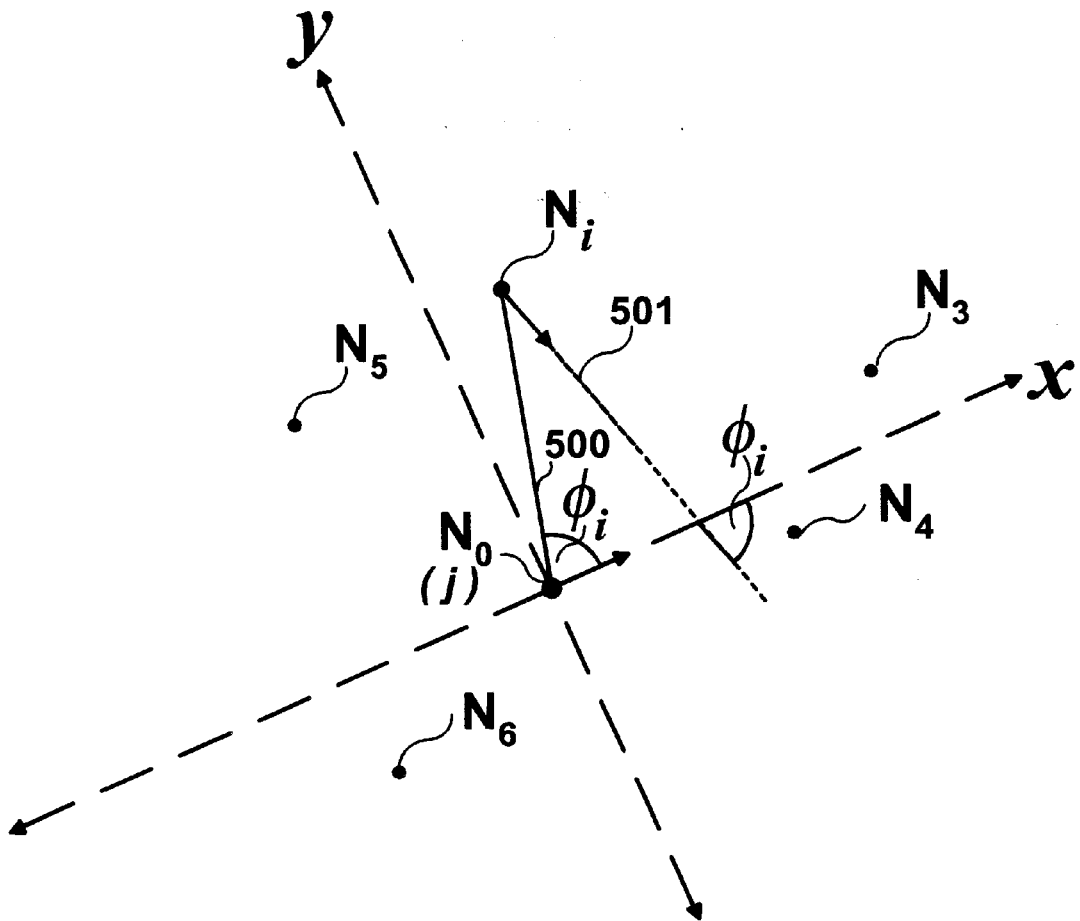
FIG. 5 shows construction of positional parameters for a neighbor minutia.

FIG. 5 shows how the positional parameters are derived. An x-axis is drawn in the direction of the line tangential to a ridge line at minutia j. A y-axis perpendicular to the x-axis is then drawn, intersecting the x-axis at minutia j. Hence, minutia j has a position of (0,0) and will be designated as the "center minutia $N_0$." A line 500 is drawn from center minutia $N_0$ to a neighbor minutia $N_i$. Line 500 has a distance $d_i$. An angle $\phi_i$ is created between the x-axis and line 500. Another line 501 is drawn from neighbor $N_i$ in the direction of a line tangential to a ridge line for neighbor minutia $N_i$ to intersect and extend through the x-axis. The angle between the extended line 501 and the x-axis is angle $\phi_i$. Hence, neighbor minutia $N_i$ may be represented by $(d_i, \phi_i, \phi_i)$. Importantly, distance $d_i$ and angles $\phi_i$ and $\phi_i$ are independent of any rotation or translation of a fingerprint image because these are relative positions with respect to center minutia $N_0$. Hence, when a fingerprint image is rotated or translated, all the minutiae associated with that center minutia $N_0$ are translated and rotated in the same fashion and amount and their relative positions with respect to the center minutia $N_0$ remain the same.

In one embodiment, all the parameters are quantized, for example, distance $d_i$ to five bits and angles $\phi_i$ and $\phi_i$ to six bits each. In one embodiment, the location information, i.e., $(x_j, y_j)$ and the minutia angle $\theta_j$, are quantized to a selected number of bits. For example, each of the position measurements $x_j$ and $y_j$ is quantized to four bits and the minutia angle $\theta_j$ is quantized to six bits. Quantization allows the parameters to be represented by fewer bits, thereby decreasing the memory requirement.

Figure 6:
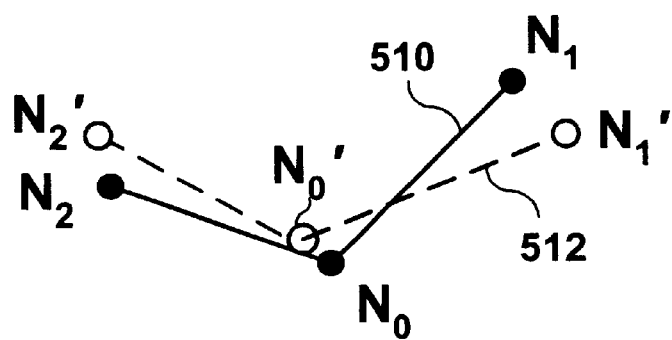
FIG. 6 shows two neighborhoods with errors between them.

FIG. 6 illustrates two neighborhoods with slight errors, both rotational and translational. Neighborhood 510 is constructed with a center minutia $N_0$ and two neighbor minutiae $N_1$ and $N_2$. Neighborhood 512 is constructed with a center minutia $N_0'$ and two neighbor minutiae $N_1'$ and $N_2'$. As can be seen, neighborhood 510 and neighborhood 512 show some resemblance, i.e., neighbor minutiae $N_1$ and $N_2$ and $N_1'$ and $N_2'$, respectively, have similar positional relationships with respect to their center minutiae $N_0$ and $N_0'$, respectively. However, there are slight differences between the two neighborhoods. As described above, the definition of the fingerprint varies under certain conditions, therefore, tolerance must be accepted. Depending on the predetermined tolerance, neighborhood 510 may or may not match neighborhood 512.

FIG. 7A shows data chunk 201 of fingerprint template $T_1$ in detail. Data chunk 201 includes three parameters: location 702, minutia angle 704, and neighborhood 706. Location 702 includes x- and y-coordinates. Neighborhood 706, in one embodiment, includes 15 neighbor minutiae $N_{11}$ through $N_{115}$. Each neighbor $N_{11}$ through $N_{115}$ further includes positional parameters such as distance $d_{1i}$ between the center minutia $N_0$ and the neighbor minutia $N_{1i}$ and two related angles $\phi_{1i}$, $\phi_{1i}$, where i is 1 through 15, as shown in FIG. 7C.

Similarly, FIG. 7B shows data chunk 211 of fingerprint template $T_2$ in detail. Data chunk 211 includes three parameters: location 752, minutia angle 754, and neighborhood 756. Location 752 includes x- and y-coordinates $x_{2j}$ and $y_{2j}$. Neighborhood 756, in one embodiment, includes 15 neighbors $N_{21}$ through $N_{215}$. Each neighbor $N_{21}$ through $N_{215}$ further includes positional parameters such as distance $d_{2i}$ between the center minutia $N_0$ and a neighbor $N_{2i}$ and two related angles $\phi_{2i}$, $\phi_{2i}$, where i is 1 through 15, as shown in FIG. 7D. Although FIGS. 7A and 7B show the same number of neighbors in data chunk 201 and data chunk 211, it is not necessary because a neighborhood match may be found if the number of neighbor minutia matches satisfies the predetermined number of neighbor minutia matches.

After fingerprint templates $T_1$ and $T_2$ are created and stored in a memory, fingerprint templates $T_1$ and $T_2$ are compared for matching minutiae using a fingerprint template matching algorithm. In one embodiment, the fingerprint template matching algorithm is similar to the one described in U.S. patent application Ser. No. 09/354,929 incorporated by reference above.

Figure 8:
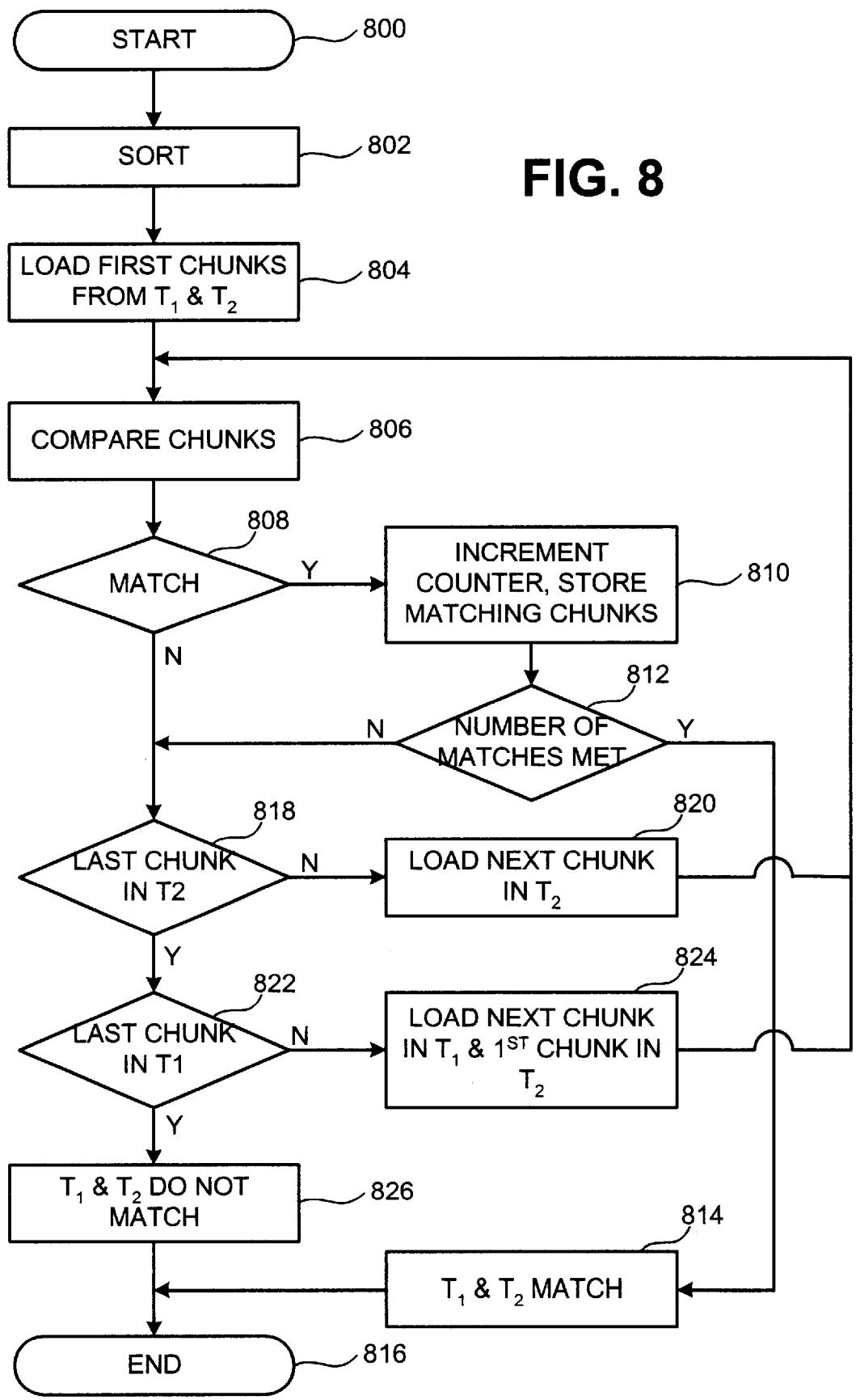
FIG. 8 shows a flowchart of a method of fingerprint template comparison.

FIG. 8 illustrates one embodiment of fingerprint template matching algorithm. The algorithm starts in step 800. In one embodiment, the data chunks are sorted in step 802, but such sorting is optional. In one embodiment, the data chunks are sorted in accordance to their x-coordinates. In another embodiment, the data chunks are sorted in accordance to their y-coordinates. In one embodiment, the data chunks in fingerprint template $T_1$ are sorted. In another embodiment, the data chunks in fingerprint template $T_2$ are sorted. In yet another embodiment, the data chunks in both fingerprint templates $T_1$ and $T_2$ are sorted.

A data chunk from each fingerprint template $T_1$ and $T_2$ is loaded into a random access memory (RAM) (step 804). The data chunks are then compared in step 806. The data chunks are compared by comparing, e.g., location $(x_j, y_j)$, minutia angle $\theta_j$ and neighborhood $NH_j$. The order of the comparison may be varied. For example, the x-coordinates are compared first. In another embodiment, the y-coordinates are compared first.

In one embodiment, the location comparison is straight subtraction. If the difference for a parameter pair is equal to or less than a respective predetermined tolerance, the parameters match. For minutia angle comparison, if the absolute value of the difference is less than or equal to a predetermined tolerance, the minutia angles match. If the absolute value of the difference is greater than the predetermined tolerance, whether the absolute value of the difference is greater than or equal to the difference between the maximum allowable quantized minutia angle and the predetermined tolerance is determined. If the absolute value of the difference is greater than or equal to the difference between the maximum allowable quantized minutia angle and the predetermined tolerance, the minutia angles match.

The neighbor to neighbor comparison includes comparing distance $d_i$, angle $\phi_i$ and angle $\varphi_i$ of a neighbor $N_i$ to the respective parameters in another neighbor. In one embodiment, the neighbors in a neighborhood are sorted by, for example, distance $d_i$. If the number of the neighbor matches is equal to or greater than a predetermined match rate, the neighborhoods match. If any of the parameters, i.e., distance $d_i$, angle $\phi_i$ or angle $\varphi_i$, fail to match, the neighbors do not match.

If all of the parameters, i.e. location, minutia angle and neighborhood, match, the data chunks match (step 808). A counter is incremented and the matching minutia pair is stored at a memory location where it can be accessed by a computer (step 810). The matching minutia pair is stored as part of a matching minutia set. If the number of data chunk matches in the counter satisfies a predetermined match rate (step 812), fingerprint templates $T_1$ and $T_2$ match (i.e., there is a sufficient overlap region between the two fingerprint templates) (step 814) and the process ends (step 816).

On the other hand, if any of the minutia characterization parameters fail to match, the data chunks do not match and the next set of data chunks are compared. In one embodiment, if the data chunk in fingerprint template $T_1$ and the data chunk in fingerprint template $T_2$ do not match, whether the last-compared data chunk in fingerprint template $T_2$ is the last data chunk in fingerprint template $T_2$ is determined (step 818). If the last-compared data chunk is not the last data chunk in fingerprint template $T_2$, the next data chunk in fingerprint template $T_2$ is loaded into the RAM to be compared with the last-compared data chunk in fingerprint template $T_1$ (step 820). The process continues until all the data chunks in fingerprint template $T_2$ have been compared.

Next, whether the last-compared data chunk in fingerprint template $T_1$ is the last data chunk in fingerprint template $T_1$ is determined (step 822). If the last-compared data chunk is not the last data chunk in fingerprint template $T_1$, the next data chunk in fingerprint template $T_1$ and the first data chunk in fingerprint template $T_2$ are then loaded into the RAM to be compared (step 824). The process continues until all the data chunks in fingerprint template $T_1$ have been compared. If the last-compared data chunk is the last data chunk in fingerprint template $T_1$, fingerprint templates $T_1$ and $T_2$ do not match (step 826) and the process terminates in step 816. In one embodiment, an indication, e.g., visual or audio, indicates that the two fingerprint images do not have a sufficient overlap region.

Figure 9:
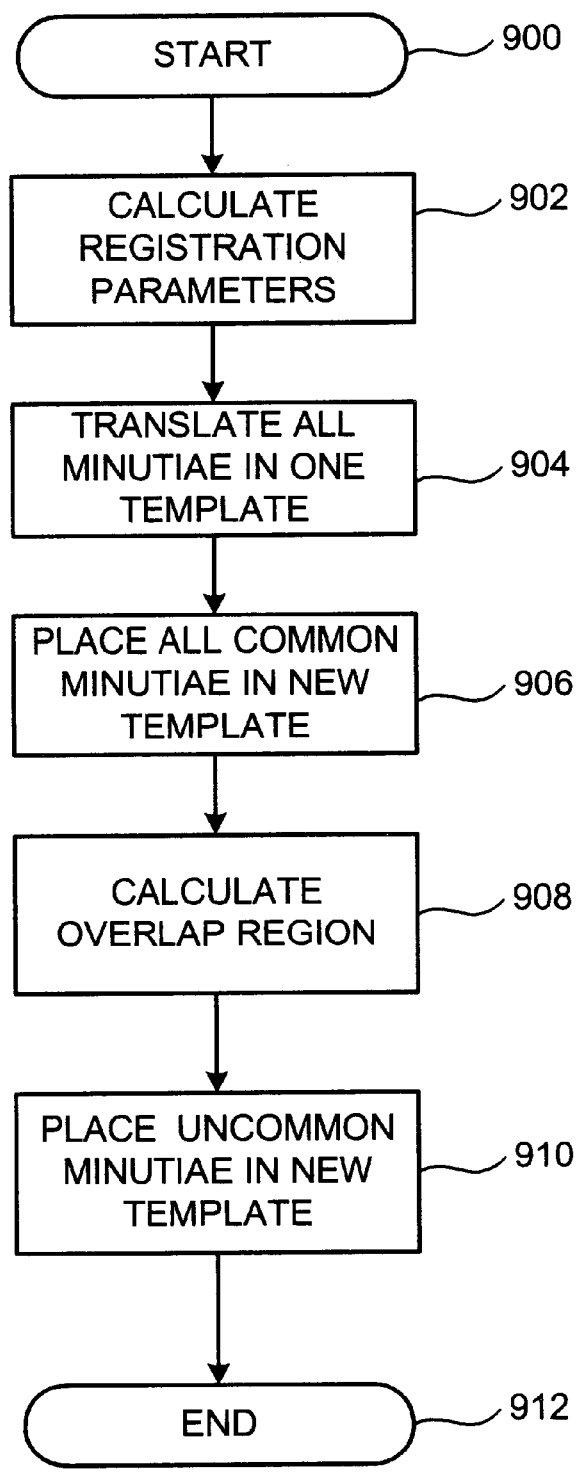
FIG. 9 shows a flowchart of a method of combining two fingerprint templates.

If there is a match between fingerprint template $T_1$ and fingerprint template $T_2$, there is a sufficient overlap region and the fingerprint templates are ready to be combined. FIG. 9 shows a flowchart of how two fingerprint templates are combined. The process starts with step 900. Registration parameters are calculated for the matching minutiae pairs stored in the memory in step 902. For the P matching minutia pairs $M_{1commp}$ and $M_{2commp}$, the registration parameters are calculated as follows:

$$x_{offset(1,2)} = \sum_{p=1}^{P} (x_{1commp} - x_{2commp})/P$$

$$y_{offset(1,2)} = \sum_{p=1}^{P} (y_{1commp} - y_{2commp})/P$$

$$\theta_{offset(1,2)} = \sum_{p=1}^{P} (\theta_{1commp} - \theta_{2commp})/P$$

In the embodiment described above, the registration is with reference to fingerprint template $T_1$. In the alternative, the registration parameters can be calculated in reference to fingerprint template $T_2$.

In a simplest case, fingerprint template $T_1$ and fingerprint template $T_2$ have only one matching pair ($M_{1comm1}$, $M_{2comm1}$). Then, P is equal to 1. Minutia $M_{1comm1}$ in partial fingerprint image 22 has a location $x_{1comm1}=10$, $y_{1comm1}=10$ and $\theta_{1comm1}=100°$ and the corresponding minutia $M_{2comm1}$ in partial fingerprint image 24 has a location $x_{2comm1}=20$, $y_{2comm1}=20$ and $\theta_{2comm1}=115°$. The registration parameters are calculated as follows:

$$x_{offset(1,2)} = \sum_{1}^{2} (10-20)/1 = -10$$

$$y_{offset(1,2)} = \sum_{1}^{2} (10-20)/1 = -10$$

$$\theta_{offset(1,2)} = \sum_{1}^{2} (100° - 115°)/1 = -15°$$

In one embodiment, the rotation registration $\theta_{offset(1,2)}$ is calculated in complex domain as described above.

Next, all the minutiae in fingerprint template $T_2$ are translated in accordance with the registration parameters so that fingerprint template $T_2$ and fingerprint template $T_1$ are on the same coordinate system (step 904). Translation is accomplished, in one embodiment, by adding a corresponding registration value to the location/angle values of all minutiae in the fingerprint template that is not the reference fingerprint template. For example, if $x_{offset(1,2)}=-10$, $y_{offset(1,2)}=-10$ and $\theta_{offset(1,2)}=-15°$, and $M_{2comm1}$ has $x_{2comm1}=20$, $y_{2comm1}=20$ and $\theta_{2comm1}=115°$, then $M'_{2comm1}$ has $x'_{2comm1}=10$, $y'_{2comm1}=10$, and $\theta'_{2comm1}=100°$. The translated minutia $M'_{2comm1}$ is now on the same coordinate system and aligned to minutia $M_{1comm1}$. It is noted that if the difference (sum in equation) of the minutia angles exceeds 360° (or $2\pi$ in radians) or less than −360° (or −$2\pi$ in radians), it wraps around.

Once the fingerprint templates $T_1$ and $T_2$ are on the same coordinate system, they can be combined easily. In one embodiment, the P matching minutiae in either fingerprint template $T_1$ or fingerprint template $T_2$ are placed in the combined template $T_{combined}$ (step 906). An overlap region is then calculated in step 908. Step 908 will be described in details below. The minutiae in fingerprint template $T_1$ and fingerprint template $T_2$ that are not matched are then placed in the combined template $T_{combined}$ (step 910).

Figure 10A:
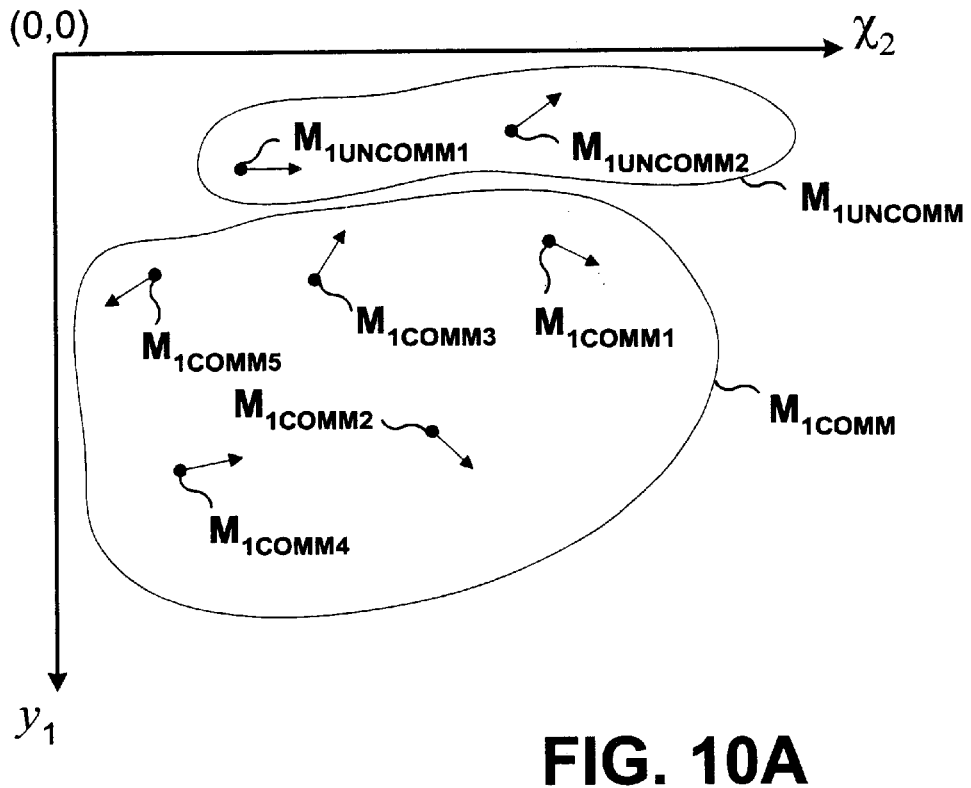
FIG. 10A shows a first minutia set containing minutiae obtained from a portion of a finger.
Figure 10B:
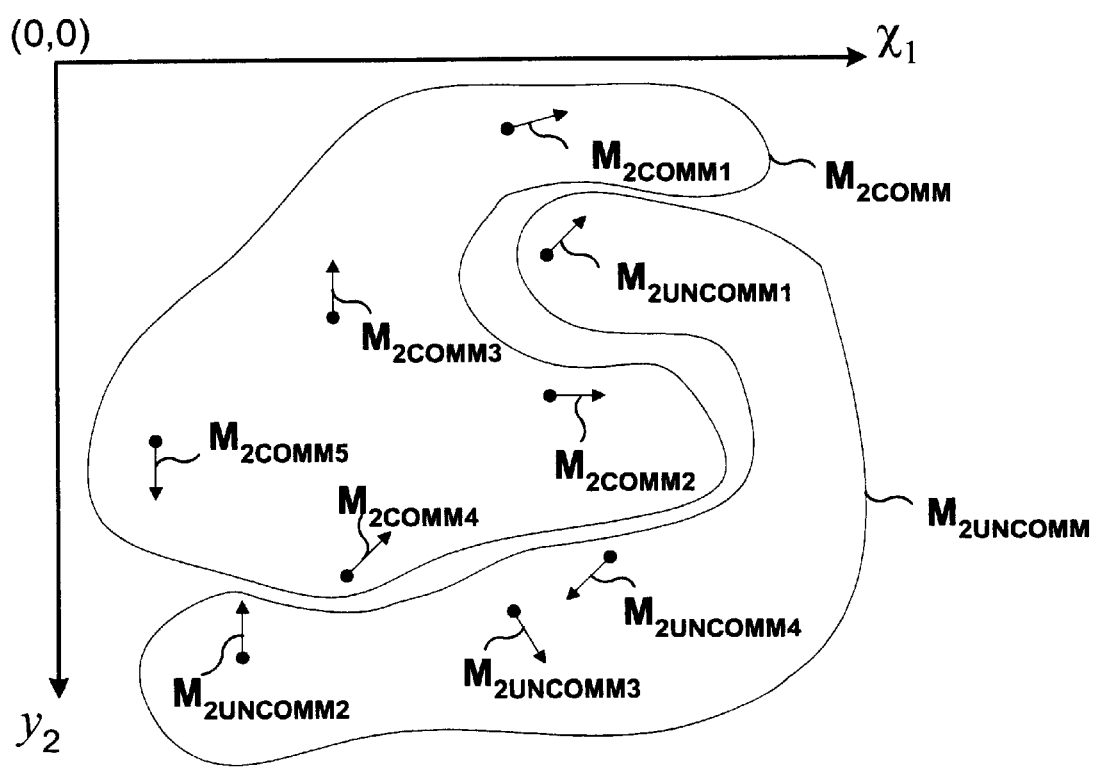
FIG. 10B shows a second minutia set containing minutiae obtained from another portion of the same finger.

FIGS. 10A through 10D illustrate graphically how two fingerprint templates each representing a sensed area of a fingerprint are merged together. FIG. 10A shows a first minutia set representing the minutiae in fingerprint template $T_1$ containing minutiae from a portion of a finger. The first minutia set includes an uncommon minutia set $M_{1uncomm}$ containing uncommon minutiae $M_{1uncomm1}$ and $M_{1uncomm2}$ and a common minutia set $M_{1comm}$ containing common minutiae $M_{1comm1}$, $M_{1comm2}$, $M_{1comm3}$, $M_{1comm4}$ and $M_{1comm5}$. FIG. 10B shows a second minutia set representing the minutiae in fingerprint template $T_2$ containing minutiae from another portion of the same finger. The second minutia set includes an uncommon minutia set $M_{2uncomm}$ including uncommon minutiae $M_{2uncomm1}$, $M_{2uncomm2}$, $M_{2uncomm3}$ and $M_{2uncomm4}$ and a common minutia set $M_{2comm}$ including common minutiae $M_{2comm1}$, $M_{2comm2}$, $M_{2comm3}$, $M_{2comm4}$ and $M_{2comm5}$. Common minutia set $M_{2comm}$ and common minutia set $M_{1comm}$ contains matching minutiae of the images taken from different portions of a fingerprint.

Figure 10C:
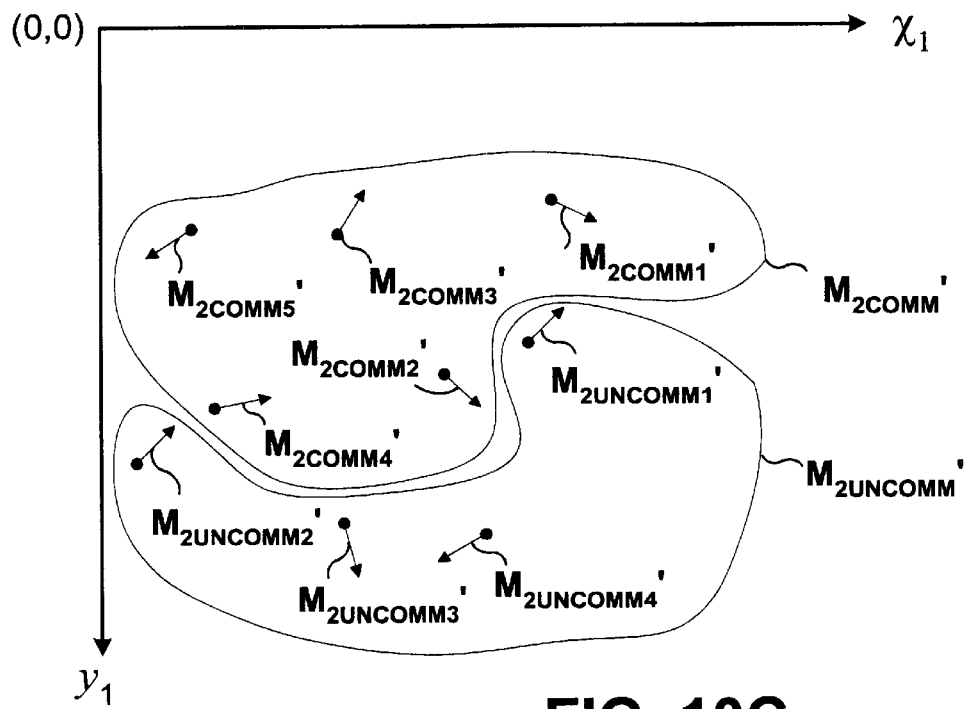
FIG. 10C shows a translated second minutia set.

FIG. 10C shows a translated second minutia set in reference to the first minutia set. The translated second minutia set includes a translated common minutia set $M'_{2comm}$ containing translated common minutiae $M'_{2comm1}$, $M'_{2comm2}$, $M'_{2comm3}$, $M'_{2comm4}$ and $M'_{2comm5}$ and a translated uncommon minutia set $M'_{2uncomm}$ containing translated uncommon minutiae $M'_{2uncomm1}$, $M'_{2uncomm2}$, $M'_{2uncomm3}$ and $M'_{2uncomm4}$.

Figure 10D:
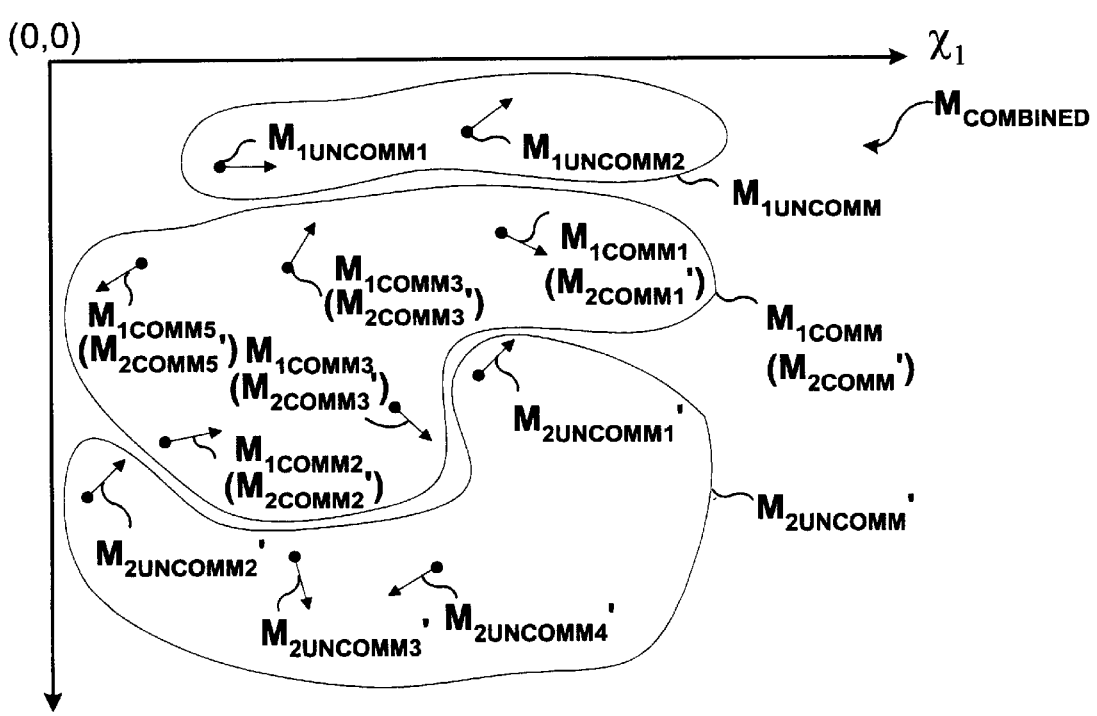
FIG. 10D shows a combined minutia set constructed from the first minutia set and the translated second minutia set.

FIG. 10D shows a combined minutia set $M_{combined}$ constructed from the first minutia set and the translated second minutia set. In one embodiment, combined minutia set $M_{combined}$ is constructed from the uncommon minutia set $M_{1uncomm}$, uncommon minutia set $M'_{2uncomm}$ and common minutia set $M_{1comm}$ or $M_{2comm}$. Note that only one common minutia set $M_{1comm}$ or $M_{2comm}$ needs to be used because they represent the same area of a fingerprint.

Figure 11A:
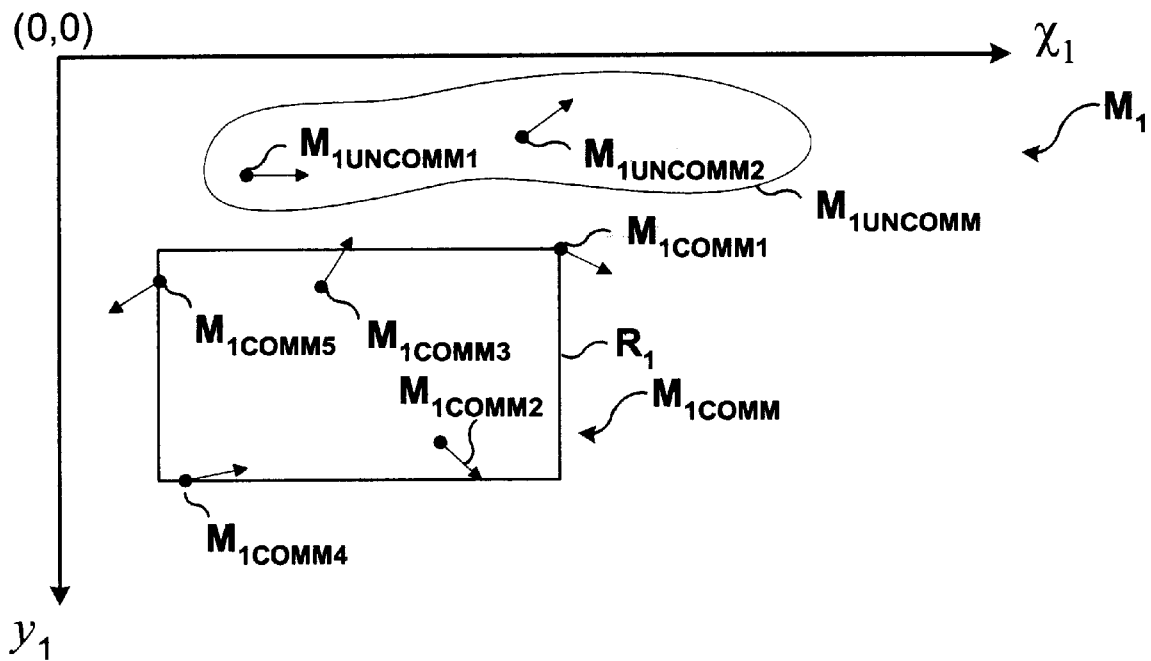
FIG. 11A shows a first minutia set containing minutiae obtained from a portion of a finger, having an overlap region with another minutia set.

In another embodiment, shown in FIGS. 11A through 11D, the overlap region between the two fingerprint templates is calculated by defining the maximum and minimum x and y values for the common minutiae. For the first minutia set $M_1$, the overlap region $R_1$, in one embodiment, is drawn as the smallest possible rectangular box around the common minutia set $M_{1comm}$, e.g., minutiae $M_{1comm1}$, $M_{1comm2}$, $M_{1comm3}$, $M_{1comm4}$ and $M_{1comm5}$, as shown in FIG. 11A. The leftmost minutia $M_{1comm5}$ defines the left side of the rectangle; the highest minutia $M_{1comm1}$ defines the upper side of the rectangle; the rightmost minutia $M_{1comm1}$ defines the right side of the rectangle; and the lowest minutia $M_{1comm4}$ defines the bottom side of the rectangle. The remaining minutiae are grouped as uncommon minutia set $M_{1uncomm}$.

Similarly, for the second minutia set $M_2$, the overlap region $R_2$ is drawn as the smallest possible rectangular box around the common minutia set $M_{2comm}$, e.g., minutiae $M_{2comm1}$, $M_{2comm2}$, $M_{2comm3}$, $M_{2comm4}$ and $M_{2comm5}$, using minutia $M_{2comm5}$ to define the left boundary, minutia $M_{2comm1}$ to define the top and the right boundaries and minutia $M_{2comm4}$ to define the bottom boundary of the overlap region. The remaining minutiae outside of overlap region $R_2$ are grouped as uncommon minutia set $M_{2uncomm2}$. Notice that overlap region boundaries for overlap region $R_2$ are rotated from the overlap region boundaries for overlap region $R_1$. Included in overlap region $R_2$ is a minutia $M_{2uncomm1}$ that has no corresponding matching minutia in overlap region $R_1$.

Figure 11B:
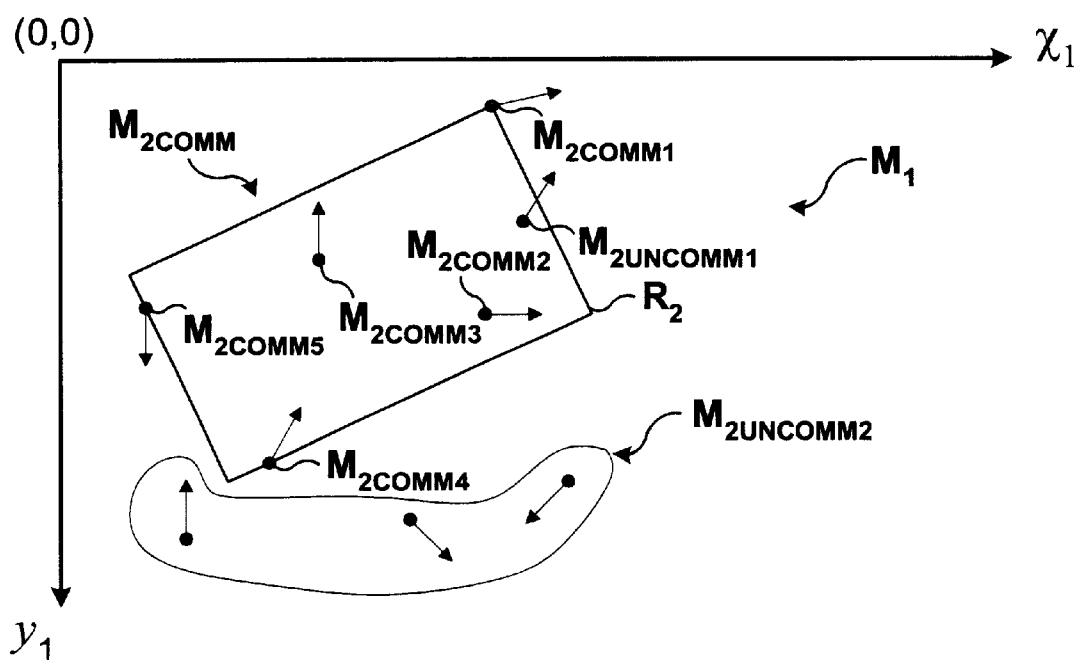
FIG. 11B shows a second minutia set containing minutiae obtained from another portion of the same finger, having an overlap region with the first minutia set.
Figure 11C:
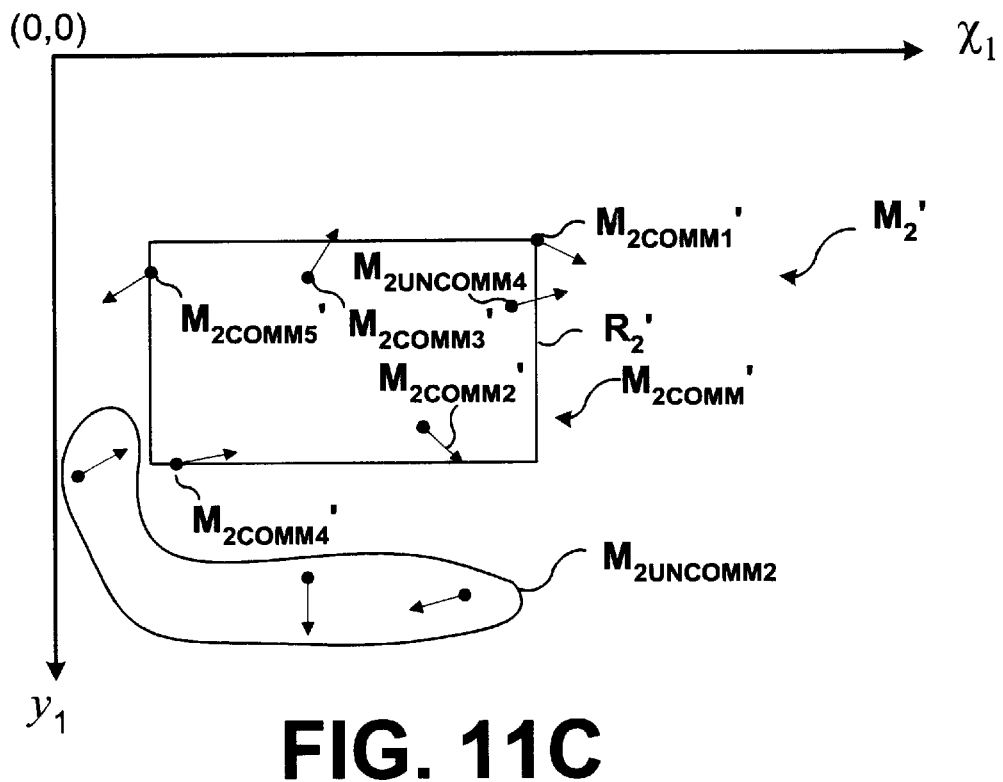
FIG. 11C shows a translated second minutia set.
Figure 11D:
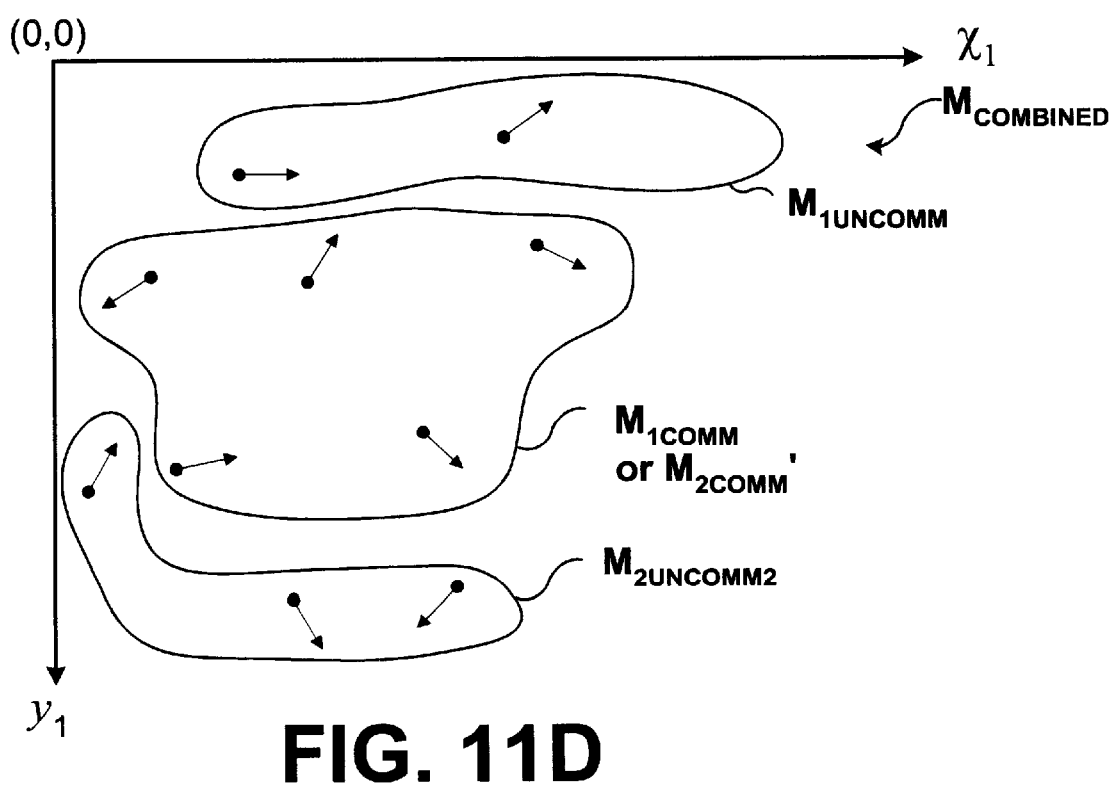
FIG. 11D shows a combined minutia set constructed from the first minutia set and the translated second minutia set.

Next, all minutiae in the second minutia set shown in FIG. 11B are translated with reference to the first minutia set shown in FIG. 11A, using the registration parameters calculated in the manner described above. After translation, all minutiae in the second minutia set $M_2$ are on the same coordinate system as first minutia set $M_1$. FIG. 11C shows the translated minutia set $M_2'$. It is noted that the overlap region can be of any other shape. First minutia set $M_1$ and translated second minutia set $M_2'$ are then combined in a manner described above.

In one embodiment, either common minutia set $M_{1comm}$ or common minutia set $M_{2comm}$ is placed in a combined minutia set $M_{combined}$. Since common minutia set $M_{1comm}$ and common minutia set $M_{2comm}$ contain matching minutiae, only one needs to be placed in the combined minutia set $M_{combined}$.

Next, the uncommon minutia set $M_{1uncomm}$ is placed in the combined minutia set $M_{combined}$. Similarly, the uncommon minutia sets $M_{2uncomm1}$ and $M_{2uncomm2}$ are placed in the combined minutia set $M_{combined}$. In one embodiment, uncommon minutia $M_{2comm1}$ is discarded and not included in the combined minutia set $M_{combined}$. Uncommon minutia $M_{2uncomm1}$ is discarded because it falls within the overlap region yet has no corresponding matching minutia, hence, may be a false minutia.

In one embodiment, if any minutia has a negative x-coordinate or a negative y-coordinate, the entire combined minutia set $M_{combined}$ is shifted so that all minutiae have a positive x-coordinate and a positive y-coordinate. This shifting is optional.

The combined minutia set can be either stored in a memory as a reference fingerprint template or used as a measured fingerprint template to be verified.

The above-described method combines two fingerprint templates extracted from two fingerprint images taken at different positions into one single fingerprint template by matching and then combining the fingerprint templates of the two fingerprint images. This method creates a combined fingerprint template as if extracted from one image, thus eliminating additional steps to smooth out the artifact effect exhibited by the prior art where two images are pasted together. In addition, this method can be accomplished with a computer with low computational power.

Additional fingerprint templates from other sensed areas of a fingerprint can be combined in a similar fashion. For example, if a third template is created from the same finger and the third template has a sufficient overlap region with either the first or the second template, the third template can be combined with the first and the second templates. In one embodiment, the first template and the second template are combined into a combined template with reference to, e.g., the first template. The combined template can then be combined with the third template translated with reference to the first template to derive a combined template which represents all three fingerprint templates. Of course, various combinations may be used.

For example, matching scores can be assigned to each comparison based on the percentage of match. For example, the first fingerprint template and the second fingerprint template have a matching score of 10; the first fingerprint template and the third fingerprint template have a matching scores of 5; and the second fingerprint template and the third fingerprint template have a matching scores of 10; then the first and the third fingerprint templates will not be combined due to a poor match. Instead, the first and the second fingerprint templates are combined to derive a first combined template; the second and the third fingerprint templates are combined to derive a second combined template; the first and the second combined templates are then combined to derive the composite fingerprint template. In general, for each combination, all fingerprint templates must be aligned, i.e., using the same coordinates.

Although the invention has been described with reference to particular embodiments, the description is only an example of the invention application and should not be taken as a limitation. Various other adaptations and combinations of features of the embodiments disclosed are within the scope of the invention as defined by the following claims.

I claim:

1. A method for combining two templates, comprising:
   providing a first template having a first minutia set and a second template having a second minutia set;
   comparing said first template with said second template to obtain a matching minutia set;
   calculating registration parameters from said matching minutia set;
   translating all minutiae in said first minutia set using said registration parameters so that said first minutia set and said second minutia set are on the same coordinates;
   combining said first minutia set with said second minutia set to derive a combined minutia set;
   creating a first overlap region in said first minutia set, said first overlap region comprising at least matching minutiae for said first template in said matching minutia set;
   creating a second overlap region in said second minutia set, said second overlap region comprising at least matching minutiae for said second template in said matching minutia set,
      wherein creating said first overlap region and said second overlap region includes:
         creating a smallest possible rectangle enclosing said matching minutiae for said first template in said first minutia set; and
         creating a smallest possible rectangle enclosing said matching minutiae for said second template in said second minutiae set; and
   discarding minutiae in said first overlap region that are not part of said matching minutiae set; and
   discarding minutiae in said second overlap region that are not part of said matching minutiae set.

2. The method of claim 1, wherein said providing a first template and a second template comprises creating a data chunk for each minutia making up said first template and each minutia making up said second template.

3. The method of claim 1, wherein said providing a first template and a second template comprises characterizing each minutia in said first minutia set and said second minutia set.

4. The method of claim 3, wherein said characterizing comprises:
   calculating a location, said location comprising an x-coordinate and a y-coordinate;
   calculating a minutia angle; and
   creating a neighborhood.

5. The method of claim 4, wherein said creating a neighborhood comprises:
   selecting a center minutia; and
   selecting a predetermined number of neighbor minutiae.

6. The method of claim 5, further comprising:
   calculating a distance between said center minutia and one of said neighbor minutiae;
   calculating a first angle between a first line drawn between said center minutia and said one of said neighbor minutiae and an x-axis tangential to a ridge line of said center minutia; and
   calculating a second angle between a second line tangential to a ridge line of said one of said neighbor minutiae and said x-axis.

7. The method of claim 1, wherein said comparing comprises:
   comparing a location of a minutia in said first minutia set with a location of a corresponding minutia in said second minutia set;
   comparing a minutia angle of said minutia in said first minutia set with a minutia angle of said corresponding minutia in said second minutia set; and
   comparing a neighborhood of said minutia of said first minutia set with a neighborhood of said corresponding minutia in said second minutia set.

8. The method of claim 7, wherein said comparing a minutia angle of said minutia in said first minutia set with a minutia angle of said corresponding minutia in said second minutia set comprises comparing in complex domain.

9. The method of claim 1, wherein said calculating comprises:
   calculating an x-coordinate offset value;
   calculating a y-coordinate offset value; and
   calculating a minutia angle offset value.

10. The method of claim 9, wherein said calculating an x-coordinate offset value comprises:
    calculating an x-coordinate difference between x-coordinates of a minutia pair in said matching minutia set;
    summing said x-coordinate difference of each said minutia pair to obtain a sum; and
    dividing said sum with the number of minutia pairs in said matching minutia set.

11. The method of claim 9, wherein said calculating an y-coordinate offset value comprises:
    calculating a y-coordinate difference between y-coordinates of a minutia pair in said matching minutia set;
    summing said y-coordinate difference of each said minutia pair to obtain a sum; and
    dividing said sum with the number of minutia pairs in said matching minutia set.

12. The method of claim 9 wherein said calculating an minutia angle offset value comprises:
    calculating minutia angle difference between minutia angles of a minutia pair in said matching minutia set;
    summing said minutia angle difference of each said minutia pair to obtain a sum; and dividing said sum with the number of minutia pairs in said matching minutia set.

13. The method of claim 9, wherein said calculating a minutia angle offset value comprises calculating said minutia angle offset value in complex domain.

14. The method of claim 9, wherein said translating comprises:
   adding said x-coordinate offset value to an x-coordinate value of each minutia in said first minutia set;
   adding said y-coordinate offset value to a y-coordinate value of each minutia in said first minutia set;
   adding said minutia angle offset value to a minutia angle of each minutia in said first minutia set.

15. The method of claim 1, wherein said combining comprises storing said matching minutiae in said first minutia set in a combined minutia set.

16. The method of claim 1, wherein said combining comprises storing said matching minutiae in said second minutia set in a combined minutia set.

17. The method of claim 1, wherein said combining comprises storing minutiae in said first minutia set not a part of said matching minutia set in a combined minutia set.

18. The method of claim 1, wherein said combining comprises storing minutiae in said second minutia set not a part of said matching minutia set in a combined minutia set.

19. The method of claim 1, further comprising shifting each minutia in said combined minutia set by a same amount so that each parameter in said combined minutia set has a positive value.

20. A computer readable medium having stored therein one or more sequences of instructions configured to cause a microprocessor to perform acts for combining two templates, the acts comprising:

providing a first template having a first minutia set and a second template having a second minutia set;

comparing said first template with said second template to obtain a matching minutia set;

calculating registration parameters from said matching minutia set;

translating all minutiae in said first minutia set using said registration parameters so that said first minutia set and said second minutia set are on the same coordinates;

combining said first minutia set with said second minutia set to derive a combined minutia set;

creating a first overlap region in said first minutia set, said first overlap region comprising at least matching minutiae for said first template in said matching minutia set;

creating a second overlap region in said second minutia set, said second overlap region comprising at least matching minutiae for said second template in said matching minutia set,
   wherein creating said first overlap region and said second overlap region includes:
      creating a smallest possible rectangle enclosing said matching minutiae for said first template in said first minutia set; and
      creating a smallest possible rectangle enclosing said matching minutiae for said second template in said second minutiae set; and discarding minutiae in said first overlap region that are not part of said matching minutiae set; and discarding minutiae in said second overlap region that are not part of said matching minutiae set.

\* \* \* \* \*